(12) United States Patent
Lee et al.

(10) Patent No.: US 8,291,767 B2
(45) Date of Patent: Oct. 23, 2012

(54) VIBRATION TESTING DEVICE

(75) Inventors: Chao-Chien Lee, Taipei Hsien (TW);
Po-Yu Lin, Taipei Hsien (TW);
Ting-Hung Su, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 671 days.

(21) Appl. No.: 12/506,403

(22) Filed: Jul. 21, 2009

(65) Prior Publication Data

US 2010/0319458 A1 Dec. 23, 2010

(30) Foreign Application Priority Data

Jun. 17, 2009 (CN) .......................... 2009 1 0303338

(51) Int. Cl.
*G01M 7/02* (2006.01)
*G01H 13/00* (2006.01)
*G01H 1/06* (2006.01)
(52) U.S. Cl. ............................................ 73/663; 73/579
(58) Field of Classification Search .............. 73/570, 73/579, 662, 663, 664, 666, 667
See application file for complete search history.

(56) References Cited

U.S. PATENT DOCUMENTS

| | | | |
|---|---|---|---|
| 4,735,089 A * | 4/1988 | Baker et al. ...................... | 73/663 |
| 4,996,881 A * | 3/1991 | Tauscher et al. ................ | 73/665 |
| 5,083,463 A * | 1/1992 | Marshall et al. ................. | 73/663 |
| 5,090,244 A * | 2/1992 | Potier et al. ...................... | 73/572 |
| 5,594,177 A * | 1/1997 | Hanse .............................. | 73/663 |
| 5,744,724 A * | 4/1998 | Hobbs .............................. | 73/665 |
| 5,804,732 A * | 9/1998 | Wetzel et al. ..................... | 73/663 |
| 6,044,709 A * | 4/2000 | Briggs et al. ..................... | 73/663 |
| 6,105,433 A * | 8/2000 | Hess ................................. | 73/663 |
| 6,220,100 B1 * | 4/2001 | Felkins et al. ................... | 73/663 |
| 6,446,508 B1 * | 9/2002 | Peterson et al. ................. | 73/571 |
| 6,904,807 B1 * | 6/2005 | Butts ................................ | 73/662 |
| 7,886,606 B2 * | 2/2011 | Hanse .............................. | 73/663 |

FOREIGN PATENT DOCUMENTS

CN 101400981 4/2009

* cited by examiner

Primary Examiner — Helen C. Kwok
(74) Attorney, Agent, or Firm — Altis Law Group, Inc.

(57) ABSTRACT

A vibration testing device to test vibration strength and frequency generated by an electronic device, includes a base, a vibration contact member, a transmission member, and a resilient member attached to the transmission member. The base includes a receiving space to receive the electronic device and a receiving hole in communication with the receiving space. The transmission member extends through the receiving hole and is rigidly attached to the vibration contact member. During testing, the electronic device directly abuts an end portion of the transmission member so that the vibration strength and frequency generated by the electronic device are directly transmitted to the vibration contact member.

7 Claims, 2 Drawing Sheets

VIBRATION TESTING DEVICE

BACKGROUND

1. Technical Field

The present disclosure generally relates to a vibration testing device.

2. Description of Related Art

Electronic devices such as mobile phones and notebooks, for example, undergo a variety of tests to ensure quality. Frequently, an electronic device is mounted in a vibration testing device to determine whether vibration strength and frequency generated by the electronic device meet standard requirements. The testing device includes a base to receive the electronic device, and a vibration contact member directly attached to the base to obtain the vibration strength and frequency generated by the electronic device. However, since the vibration strength and frequency generated by the electronic device is transmitted to the vibration contact member via the base, some vibration energy generated by the electronic device is absorbed by the base during testing, resulting in improper test results.

Therefore, a need exists in the industry to overcome the described limitations.

DETAILED DESCRIPTION

Figure 1:
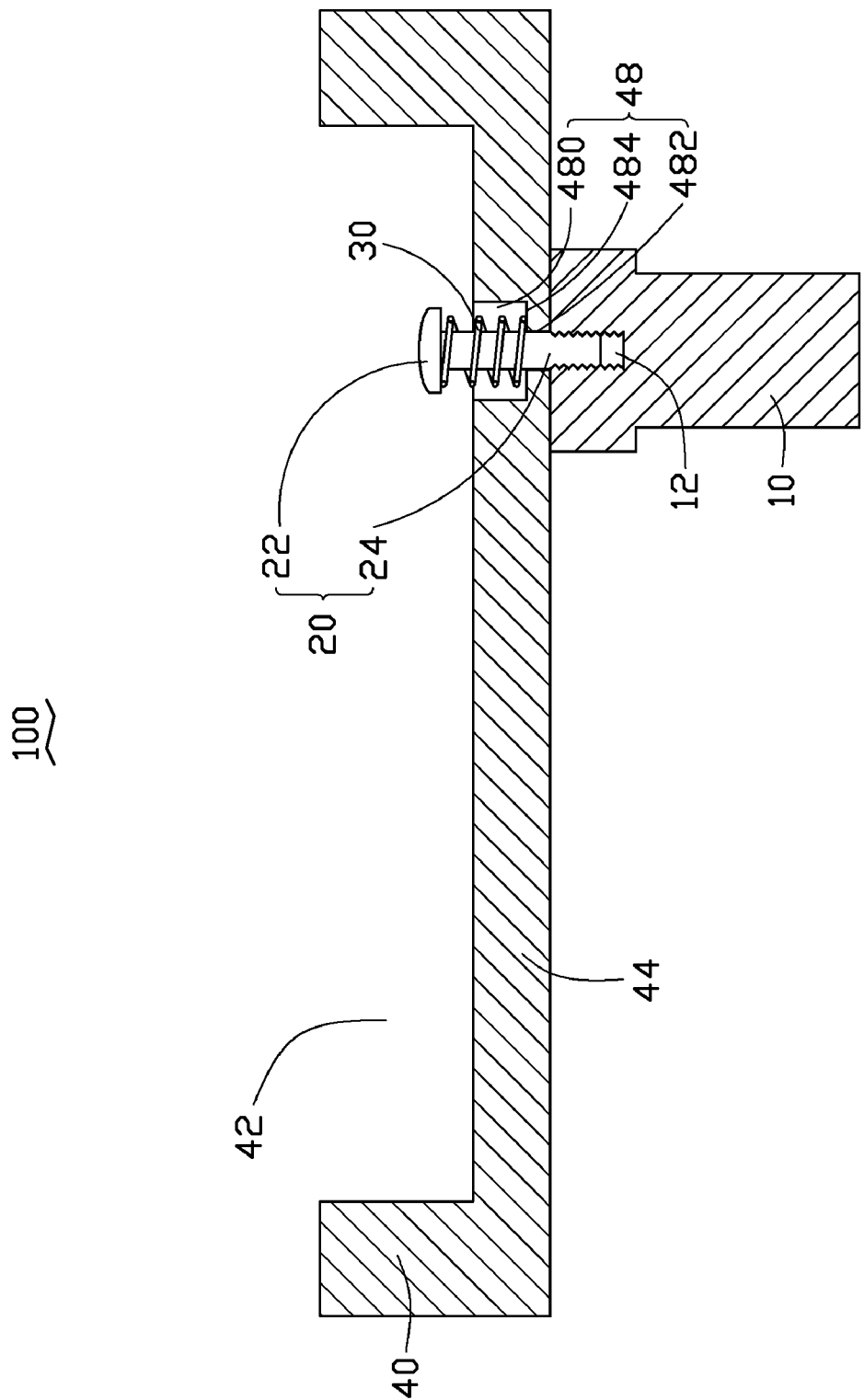
FIG. 1 is an assembled, schematic diagram of a vibration testing device of the disclosure.
Figure 2:
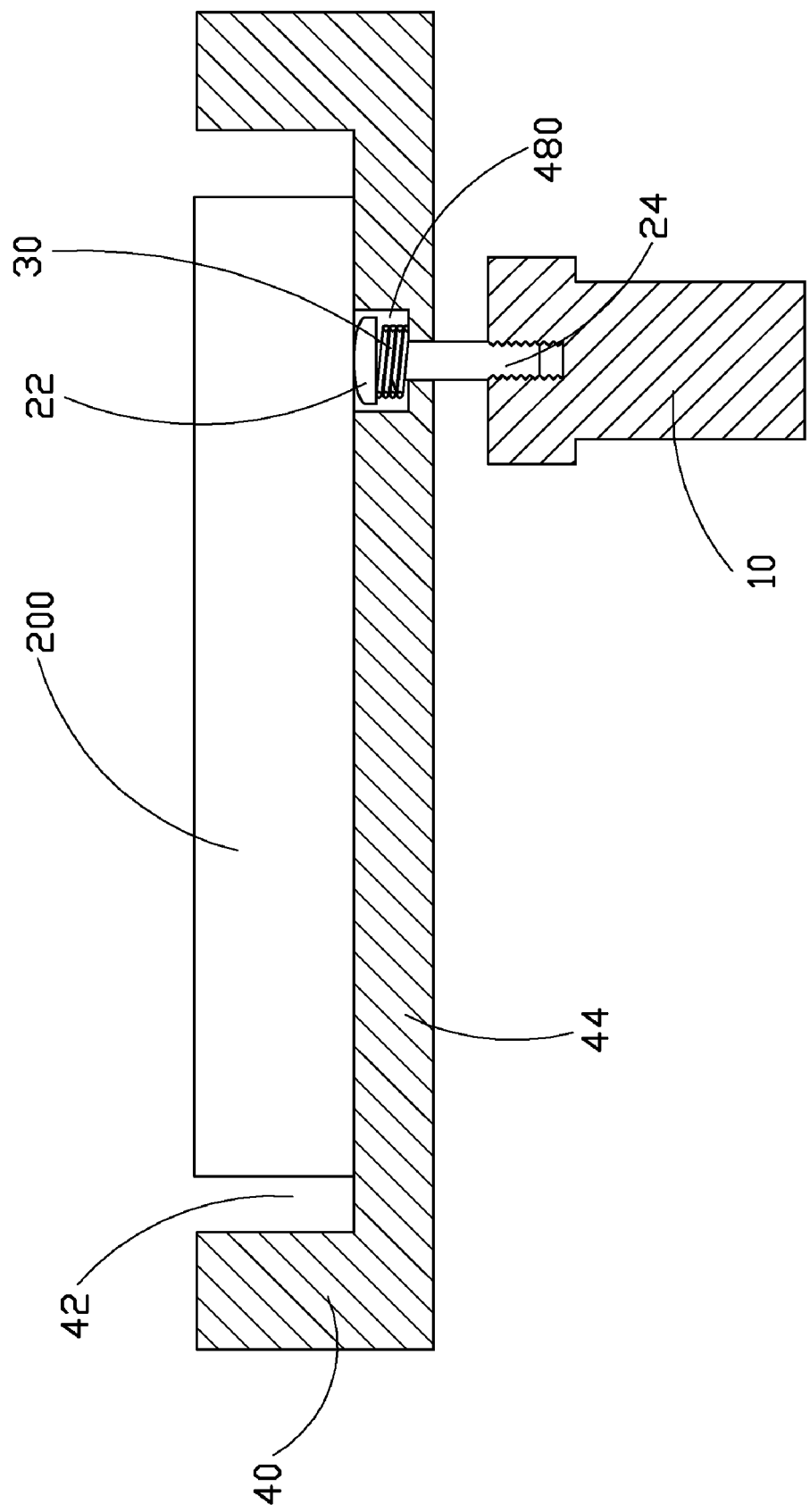
FIG. 2 is similar to FIG. 1, showing an electronic device received in the vibration testing device.

Referring to FIG. 1-FIG. 2, a testing device 100 determines whether vibration strength and frequency generated by an electronic device 200 such as a mobile phone, or a notebook, for example, meet standard requirements. The testing device 100 includes a vibration contact member 10, a transmission member 20, a resilient member 30, and a base 40 to receive the electronic device 200.

The base 40 defines a receiving space 42 to receive the electronic device 200, and a ladder-shaped receiving hole 48 located in a bottom of the receiving space 42 and in communication with the receiving space 42. The receiving hole 48 includes a locating hole 480, a through hole 482, and a step 484 between the locating hole 480 and the through hole 482. A diameter of the locating hole 480 is greater than a diameter of the through hole 482.

The vibration contact member 10 obtains the vibration strength and frequency generated by the electronic device 200, and defines a mounting hole 12. In the illustrated embodiment, the mounting hole 12 is threaded.

The transmission member 20 is rigidly connected to the vibration contact member 10, and includes a transmission shaft 24 and a supporting portion 22 located at a first end of the transmission shaft 24. In the illustrated embodiment, the supporting portion 22 can be a flange. A diameter of the flange is greater than a diameter of the transmission shaft 24, and less than a diameter of the locating hole 480.

The transmission shaft 24 includes a plurality of threads formed at a second end thereof apart from the supporting portion 22. The transmission shaft 24 extends through the receiving hole 48, and is fixed in the mounting hole 12 of the vibration contact member 10 to rigidly connect the transmission member 20 and the vibration contact member 10. In the illustrated embodiment, the transmission member 20 is a screw or a bolt.

Alternatively, the supporting portion 22 may be a pin extending through the first end of the transmission shaft 24. A length of the pin is greater than the diameter of the transmission shaft 24.

The resilient member 30 is attached to the transmission shaft 24 and located between the supporting portion 22 and the step 484 so that the supporting portion 22 tightly abuts the electronic device 200. In the illustrated embodiment, the resilient member 30 can be a spring.

During assembly, the resilient member 30 is attached to the transmission shaft 24. The second end of the transmission shaft 24 extends through the receiving hole 48 of the base 40 and is fixed in the mounting hole 12 of the vibration contact member 10. The electronic device 200 is received in the receiving space 42 of the base 40, and a vibration source of the electronic device (not shown) properly abuts the supporting portion 22 of the transmission member 20. Thus, the vibration contact member 10, the transmission member 20, the resilient member 30, the base 40, and the electronic device 200 are assembled. In this assembled state, the transmitting portion 22 of the transmission member 20 is located in the locating hole 480. The resilient member 30 is compressed. The vibration contact member 10 is overhung. That is, the vibration contact member 10 does not contact the base 40.

In use, the vibration strength and frequency generated by the electronic device 200 are directly transmitted to the vibration contact member 10 via the transmission member 20. During testing, the vibration energy generated by the electronic device 200 absorbed by the base 40 is substantially lessened, thus improving the accuracy of test results.

Because the transmission member 20 is rigidly connected to the vibration contact member 10, the vibration energy generated by the electronic device 200 absorbed by the transmission member 20 is substantially lessened, thus improving the accuracy of test results.

Because the vibration contact member 10 does not directly contact the base 40, the vibration generated by the base 40 is not transmitted to the vibration contact member 10, thus improving the accuracy of test results.

While an embodiment of the present disclosure has been described, it should be understood that it has been presented by way of example only and not by way of limitation. Thus the breadth and scope of the present disclosure should not be limited by the above-described exemplary embodiments, but should be defined only in accordance with the following claims and their equivalents.

What is claimed is:

1. A vibration testing device to test vibration strength and frequency generated by an electronic device, the vibration testing device comprising:

a base comprising a receiving space to receive the electronic device and a receiving hole in communication with the receiving space;

a vibration contact member to obtain the vibration strength and frequency generated by the electronic device;

a transmission member extending through the receiving hole and rigidly attached to the vibration contact member; and a resilient member connected between the base and the transmission member;

wherein during testing, the electronic device directly abuts an end portion of the transmission member, the transmission member moves along the receiving hole to enable the vibration contact member to move away the base synchronously, causing the resilient member to become compressed and the vibration contact member to be overhung, so that the vibration strength and frequency generated by the electronic device are directly transmitted to the vibration contact member.

2. The vibration testing device as recited in claim 1, wherein the transmission member comprises a transmission shaft and a transmitting portion located at a first end of the transmission shaft.

3. The vibration testing device as recited in claim 2, wherein the transmitting portion is a flange, wherein a diameter of the flange is greater than a diameter of the transmission shaft.

4. The vibration testing device as recited in claim 2, wherein the transmitting portion is a pin extending through the first end of the transmission shaft, wherein a length of the pin is greater than a diameter of the transmission shaft.

5. The vibration testing device as recited in claim 2, wherein the receiving hole comprises a locating hole, a through hole, and a step between the locating hole and the through hole, wherein a diameter of the locating hole is greater than a diameter of the through hole.

6. The vibration testing device as recited in claim 5, wherein the resilient member is fixed between the transmitting portion of the transmission member and the step of the receiving hole.

7. The vibration testing device as recited in claim 6, wherein the resilient member is a spring.

* * * * *